US007280911B2

(12) United States Patent
Rauner et al.

(10) Patent No.: US 7,280,911 B2

(45) Date of Patent: Oct. 9, 2007

(54) METHOD FOR THE DETECTION OF FAULTS IN THE ENGINE CONTROL IN INTERNAL COMBUSTION ENGINES HAVING AT LEAST TWO CONTROL UNITS

(75) Inventors: Thomas Rauner, Blaustein (DE); Stephan Pelters, Tiefenbronn (DE)

(73) Assignee: Dr. Ing. h.c.F. Porsche Aktiengessellschaft, Stuttgart (DE)

( * ) Notice: Subject to any disclaimer, the term of this patent is extended or adjusted under 35 U.S.C. 154(b) by 148 days.

(21) Appl. No.: 11/269,680

(22) Filed: Nov. 9, 2005

(65) Prior Publication Data

US 2006/0100772 A1 May 11, 2006

(30) Foreign Application Priority Data

Nov. 10, 2004 (DE) ..................... 10 2004 054 231

(51) Int. Cl.
*G06G 7/70* (2006.01)
*G06F 19/00* (2006.01)
*F02D 44/22* (2006.01)

(52) U.S. Cl. ..................................................... 701/114

(58) Field of Classification Search ................ 701/114, 701/115, 102
See application file for complete search history.

(56) References Cited

U.S. PATENT DOCUMENTS

| | | | | |
|---|---|---|---|---|
| 4,305,351 | A * | 12/1981 | Staerzl | 123/73 A |
| 5,074,113 | A * | 12/1991 | Matsuoka | 60/276 |
| 5,255,642 | A * | 10/1993 | Pischke et al. | 123/179.3 |
| 6,499,475 | B2 * | 12/2002 | Vieser et al. | 701/109 |

FOREIGN PATENT DOCUMENTS

DE 42 31 449 C 2 3/1994

* cited by examiner

*Primary Examiner*—Hieu T. Vo
(74) *Attorney, Agent, or Firm*—Crowell & Moring LLP

(57) ABSTRACT

A system and method for monitoring the control of an engine having at least two control units, which is constructed of at least two cylinder rows or of two partial engines is provided. A control unit is assigned to each cylinder row or each partial engine, which control unit, on the basis of detected operating parameters, controls the function of the respective cylinder bank assigned to it or of the partial engine assigned to it. The control units mutually exchanging their control variables, and the detected operating parameters and the control variables emitted by the control units being monitored jointly to determine their credibility.

9 Claims, 1 Drawing Sheet

METHOD FOR THE DETECTION OF FAULTS IN THE ENGINE CONTROL IN INTERNAL COMBUSTION ENGINES HAVING AT LEAST TWO CONTROL UNITS

The present application claims priority under 35 U.S.C. § 119 to German Patent Application No. 102004054231.7 filed on Nov. 10, 2004, the entire disclosure of which is herein expressly incorporated by reference.

BACKGROUND AND SUMMARY OF THE INVENTION

The invention is based on a method for controlling the driving power of an engine having at least two control units.

German Patent Document DE 42 31 449 C1 discloses a system for controlling the driving power of an engine, which is constructed of at least two cylinder rows, and has at least two control units for influencing the performance of the individual cylinders rows. At least one measuring device is assigned to each control unit so that each control unit, separately of the other and without using the measuring values assigned to the other control unit, can compute control variables and monitor faults by itself. In this case, the first control unit is assigned to a first cylinder row and the second control unit is assigned to a second cylinder row. The operating parameters detected from each cylinder row are fed to the control units as a basis for computing the control variables.

The control of an engine by means of at least two control units can be arranged as in German Patent Document DE 42 31 449 C1 in such a manner that each control unit is assigned to a cylinder row. Also, only one cylinder row may be provided which, similar to aircraft engines, consists of partial engines which are controlled by two redundantly operating control units.

In contrast to the known arrangement, the method according to the invention has the advantage that the operating variables of the at least two control units are detected, compared with one another and are evaluated depending on the applicable deviation tolerances. In addition, the fault monitoring of each individual control unit is compared with the values of the other control units. In the case of engines with two cylinder rows, it therefore becomes possible to take measurements by means of monitoring the data in the control unit when a cylinder row is not operating correctly in order to avoid damage to the still properly operating cylinder row caused by the cylinder row which is not operating correctly.

DETAILED DESCRIPTION OF THE DRAWINGS

Figure 1:
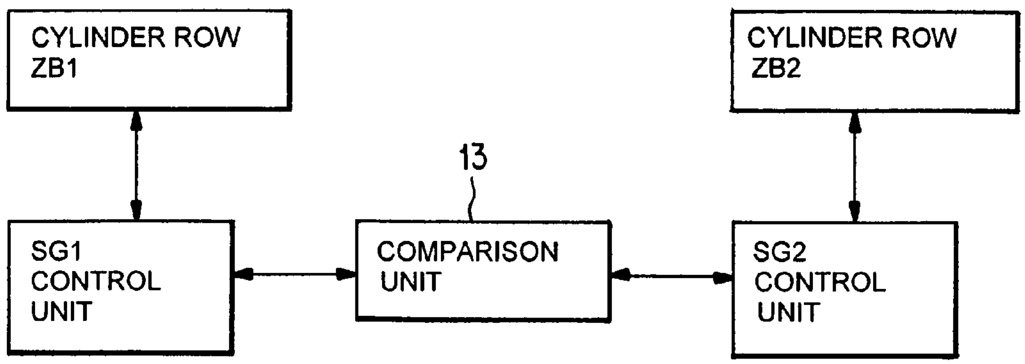
FIG. 1 is a schematic overview of the construction of an engine having two cylinder rows and two control units.

The embodiment will be explained in detail in the following. FIG. 1 is a basic overview of the construction of an internal combustion engine having two cylinder rows ZB1 and ZB2. At least one control unit SG1 and SG2 respectively is assigned to each cylinder row or each partial engine. These control units compute the control variables for the respective cylinder row on the basis of detected operating parameters BP1 and BP2 which are sensed by sensors which are not shown. In this case, the computation of the individual control parameters takes place in a manner adapted to the current operating conditions. When a parameter, such as the engine temperature, changes, the control unit will initiate a corresponding correction of the pertaining control variable. Because of differently detected or faulty data or because a cylinder row is not operating properly, the control units SG1 and SG2 may emit different control variables to the cylinder row assigned to them. As illustrated in FIG. 1, the control units are coupled to a comparison unit 13. In this comparison unit 13, the differences in input variables or computation variables, as well as the emitted control variables of the respective cylinder row assigned to a control unit, are checked by comparing them with one another.

Figure 2:
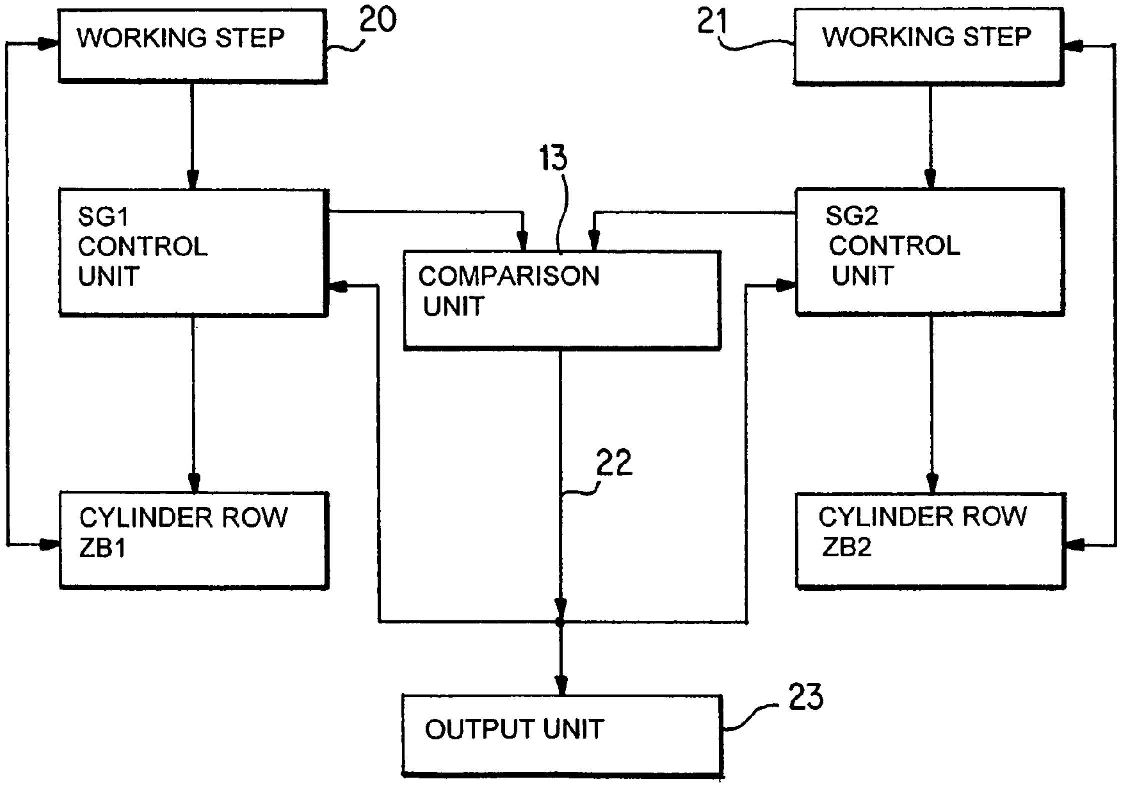
FIG. 2 is a basic flow chart for implementing the method according to the invention.

FIG. 2 illustrates an overview of the exchange of the detected data and of the computed control variables as well as the determination of credibility of the data and control variables.

First, for controlling the combustion in the cylinders of an internal combustion engine, in an working step 20, all operating parameters of the first cylinder row BP-ZB1 are detected and, parallel thereto, in a working step 21, all operating parameters of the second cylinder row BP-ZB2 are detected. These operating parameters, such as, among others, the engine temperature, the intake air temperature, the load, the rotational speed, the suction pipe pressure, the ambient pressure, the lambda value, are fed to the respective control unit SG. Each cylinder row or each partial engine has a separate control unit which, on the basis of the corresponding operating parameters, determines the respective control variables and subsequently emits the corresponding control demands to cylinder row ZB1 or ZB2 for a corresponding working operation. The control units SG1 and SG2 are coupled to the comparison unit 13. Thus, all detected operating parameters as well as the respective control variables are provided to this comparison unit. The present invention is based on the recognition that, during the operation of a multicylinder engine with separately controllable cylinders rows, essentially the same control variables are computed and emitted for the control to the respective cylinder row.

The comparison unit 13 now evaluates all detected values, input parameters and control variables under this aspect.

Different approaches can also be used in this case, On the one hand, since the two different engine controls also have to adapt and train themselves, it can be assumed that a condition may occur in which half of the engine, and corresponding control unit has learned, but the other still requires a training time.

Another variant consists of monitoring different conditions for each individual cylinder. Furthermore, when detecting faults in the exhaust train, the lambda control can be tested. Thus, the lambda control may have different conditions which may indicate that one engine half is operated with increased leakage air. This effect may have an influence on the drivability and, in turn, may have a negative influence on the exhaust gas result. By means of a definable permissible deviation tolerance, the parameters may be monitored and diagnosed. Finally, faulty input quantities have the result that the control units activates a catalytic converter on one cylinder row and set a normal operation on the other. These discrepancies are detected in the comparison unit 13 and can be eliminated by way of corresponding steps, or an assignment of the defectively operating cylinder row can be detected so that the latter can be switched off.

By way of a coupling 22, the results of the comparison unit 13 are returned to the respective control units SG1 and SG2 and to an output unit 23 for providing acoustic and/or visual information to the driver.

The result of the credibility verification is evaluated in the respective control units and, in the event of a defectively operating cylinder row, may have the effect that the engine operation is restricted. Simultaneously, a fault entry is added to the fault memory of the control unit.

The driver, who was informed by a corresponding indication, can drive to a repair shop where the fault memory can then be read out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of monitoring the control of an engine of an internal combustion machine, wherein a plurality of control units are used for the engine control, wherein the engine comprises at least two cylinder rows or two partial engines, and each cylinder row or each partial engine has at least one of the plurality of control unit assigned to it, wherein on the basis of detected operating parameters, one of the plurality of control units controls the function of the respective cylinder row or partial engines assigned to it, wherein the plurality of control units mutually exchange their control variables, and wherein the detected operating parameters and the control variables emitted by the plurality of control units are monitored in a joint evaluation with respect to their credibility.

2. Method according to claim 1, wherein when a deviation or exceeding of a definable deviation tolerance is detected, a fault entry occurs and a driver receives visual or acoustic information.

3. Method according to claim 2, wherein after the fault is detected, corresponding measures are initiated for eliminating the fault.

4. A method of the control of an engine, comprising the acts of:

assigning a first control unit to a first cylinder row or first partial engine;

assigning a second control unit to a second cylinder row or second partial engine;

detecting operating parameters of the first cylinder row or first partial engine by the first control unit;

controlling the first cylinder row or the first partial engine by the first control unit;

mutually exchanging control variables between the first control unit and second control unit; and determining the credibility of the control variables through joint evaluation of the control variables by a comparison unit.

5. The method of claim 4, wherein when a deviation or exceeding of a definable deviation tolerance is detected by the comparison unit, a fault entry occurs and a driver receives visual or acoustic information.

6. The method according to claim 5, wherein after the fault is detected, corresponding measures are initiated for eliminating the fault.

7. An engine control system comprising:

a first control unit that detects the operating parameters of a first cylinder row of an engine;

a second control unit that detects the operation parameters of a second cylinder row of an engine; and a comparison unit that is coupled to the first and second control units, wherein input variables, computation variables or emitted control variables of the first cylinder row are checked by comparing them with respective input variables, computation variables or emitted control variables of the second cylinder row.

8. The engine control system of claim 7, wherein when a deviation or exceeding of a definable deviation tolerance is detected by the comparison unit, a fault entry takes place and a driver receives visual or acoustic information.

9. The engine control system according to claim 8, wherein after the fault is detected, corresponding measures are initiated for eliminating the fault.

* * * * *